April 23, 1940.   J. W. BOWMAN   2,197,919
METHOD AND APPARATUS FOR MAKING CANDY AND THE LIKE
Filed Jan. 5, 1939
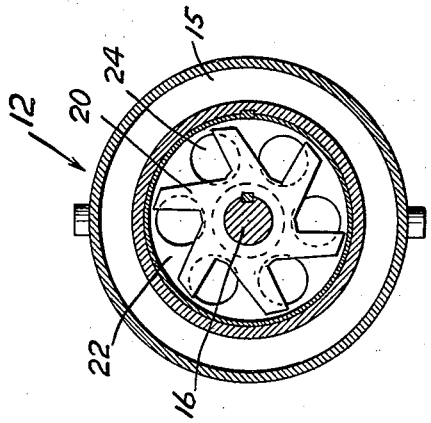
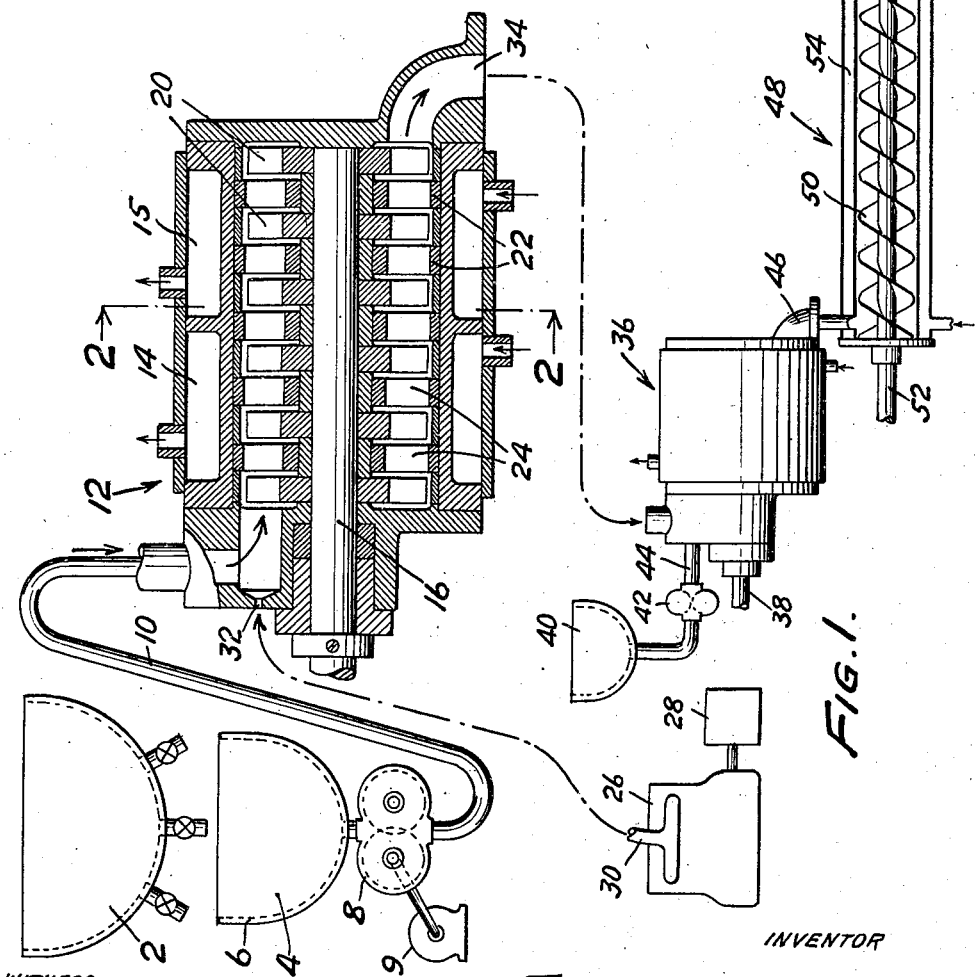
INVENTOR
Jacob Warren Bowman
BY
ATTORNEYS
WITNESS:

Patented Apr. 23, 1940

2,197,919

UNITED STATES PATENT OFFICE 2,197,919

METHOD AND APPARATUS FOR MAKING CANDY AND THE LIKE

Jacob Warren Bowman, Cynwyd, Pa., assignor to Gum, Incorporated, Philadelphia, Pa., a corporation of Pennsylvania Application January 5, 1939, Serial No. 249,527

17 Claims. (Cl. 107—54)

This invention relates to a method and apparatus for making candy or the like, for example, a candy and chewing gum mixture, and specifically relates to a method and apparatus for the incorporation of a gas such as air or carbon dioxide into the candy.

It is customary, in order to make candy pleasant to chew, to incorporate air for the purpose of increasing its bulk and thereby decreasing its density. Heretofore this has been generally accomplished by pouring the molten unaerated candy upon slabs and then, after cooling to a point at which it is quite viscous, subjecting it to a pulling operation to entrap air. The air so entrapped is not uniformly contained in the product and is contained in the form of relatively large bubles, for example, of the nature of those found in taffy.

In the event that chewing gum is incorporated in the candy mixture, incorporation of air by pulling or other cold working is not practical because of the attendant destruction of the elastic characteristics of the rubber of the chewing gum base. Air has been incorporated in chewing gum heretofore only by reason of its being carried in the spaces between the granules of powdered sugar when the latter is added to the base. The resulting chewing gum contained crystals of sugar discernible on biting into the gum, and these crystals furthermore, produced a comparatively open surface of the gum into which oxygen could be absorbed from the air producing relatively rapid oxidation.

It is one object of the present invention to provide a method and apparatus for incorporating into candy air or another gas such as carbon dioxide in the form of very minute bubbles substantially uniformly distributed through the mass. In accordance with the improved method, the relative quantities of gas and candy mixture are carefully controlled. Te secure uniformity and small size of bubbles the incorporation of the gas is effected at a relatively high temperature, as contrasted with the incorporation at relatively low temperatures heretofore practiced, so that the incorporation takes place when the viscosity of the candy mixture is low and the mixture can be readily beaten up to secure a more uniform product. Under the viscosity conditions at which incorporation of the air takes place, the air would readily separate if the mixture was permitted to become quiescent. Accordingly, it is perferred to maintain agitation to a sufficient degree to prevent separation of the gas during the cooling process and until the viscosity of the mixture is sufficiently high so that the separation of air will be prevented, i. e., until the condition of cold flow substantially ceases. Cooling should be effected as quickly as possible. The resulting mixture may then be extruded and wrapped directly.

The improved method and apparatus make it possible to provide an improved chewing gum in which, though gas is incorporated, sugar is not present in the form of crystals. In the preferred method of preparing this product, there is first prepared a sugary syrup in which air is incorporated in a finely dispersed state and then this sugar is mixed with chewing gum base with only such attendant agitation as will produce thorough admixture, but will not destroy the elasticity of the base. The resulting product is, in a sense, an aerated caramel chewing gum which contains no crystals which can be felt on chewing. By reason of the homogeneous condition of the product, the surface is relatively impervious to penetration by atmospheric air and consequently deterioration by oxidation is substantially reduced. The method and apparatus also make it possible to incorporate candy ingredients in gum in a relatively high proportion as compared with standard practice. In such a mixture, there may be incorporated a substantial proportion of a hard fat in the form of a hydrogenated oil.

The above and other objects, particularly relating to details of the invention, will become apparent from the following description read in conjunction with the accompanying drawing, in which:

Figure 1 represents diagrammatically a type of apparatus suitable for the carrying out of the preferred process; and Figure 2 is a section through the mixer taken on the plane indicated at 2—2 in Figure 1.

The invention will be described in its embodiment in a more elaborate type of process for the formation of an aerated chewing gum. It will be understood, however, that aerated candy may be produced along similar lines merely by omitting the addition of chewing gum base and those steps of the process and portions of the apparatus which are solely related to the addition of such base.

The candy mixture, which may contain any of the conventional candy ingredients, and preferably such ingredients as will result in the production of a "chewey" type of candy, may be cooked in any conventional fashion in one or more kettles, conventionally illustrated at 2.

Since, as will be apparent later, the improved steps of the method are directed to a continuous rather than a batch process, the cooking may be performed in a series of large kettles which may be discharged to the subsequent apparatus so as to provide through the subsequent apparatus a substantially continuous flow. Since the cooking should take place for predetermined periods, and, for example, at 260° F., and since the subsequent processing should place at lower temperatures on the order, say, of 230° F., if the cooking occurs at the temperature just mentioned, the various cooking kettles may be discharged into one or more supply kettles 4, jacketed as indicated at 6 so as to be maintained at a suitable temperature of, for example, 230° F. as mentioned above. The proper temperature will vary for different mixtures, but what is desired is the maintenance of as high a temperature as possible consistent with the prevention of undesirable changes in the composition, so as to maintain the mixture in a condition of as low viscosity as possible to permit the easy subsequent incorporation of gas.

From a supply kettle 4 the mixture is fed by means of a positive pump 8, such as a gear pump, through a pipe 10 to a mixer, which is indicated generally at 12. The positive pump is used to insure the uniform and continuous delivery of the mixture. Desirably, to attain the maximum uniformity, the pump 8 is driven by means of a synchronous or induction motor, indicated at 9, the substantial constancy of load making it possible to use an induction motor with assurance that the delivery of the pump will be substantially uniform. Alternatively, a direct current motor having fairly constant speed may be used, or, since synchronism with other portions of the apparatus is desired as indicated hereafter, common shafting may be used to operate at properly related speeds various portions of the apparatus. The pump and line 10 are preferably steam jacketed, as is also the mixer 12 in its first stages, the steam jacket of which is indicated at 14. All of these are desirably maintained at the temperature of the kettle 4, though in the jacket of the mixer a somewhat lower temperature may be maintained if desired.

The mixer 12 has extending through it a shaft 16 driven at a high speed, for example, of the order of 2000 R. P. M., by means of a suitable motor. This mixer may, for example, have an inside diameter of about six inches and the shaft 16 carries paddle members indicated at 20, having teeth as indicated more clearly in Figure 2. Between the sets of paddle members 20 there are provided baffles indicated at 22, extending inwardly toward the shaft and provided with openings 24 through which the mixture may pass between the chambers in which the paddle members rotate.

An air compressor 26, preferably of multi cylinder type so as to provide a substantially uniform delivery of gas to the mixer, is driven by a substantially constant speed motor 28 of synchronous or induction, or substantially constant speed direct current, type. Alternatively, this compressor may be driven in synchronism with the pump 8 by means of a common motor through connecting shafting and gearing. The compressor is preferably of a type having small cylinder head clearances so that despite fluctuating viscosity conditions in the mixer, the air delivered by the compressor to the mixer through the connecting passage 30 and the opening 32 will be substantially constant in amount. The amount of delivery may be varied if desired by the provision of changed speed gearing (not shown) between the motor and the compressor.

By the above described arrangement, both the air and candy mixture are substantially uniformly delivered to the inlet passage of the mixer in predetermined ratio. The high velocity paddles or impeller blades within the mixer serve to create turbulence, and consequently break up the entering air into very fine bubbles, which are carried along in the mixture. By the arrangement of the paddles and baffles with openings as indicated, the mixture thrown out by centrifugal action is forced to flow repeatedly inwardly through the openings and then again outwardly, with the result that uniform admixture is obtained with the formation of bubbles of extremely minute size.

The temperature conditions during this mixing may be varied depending upon the particular characteristics of the candy mixture which is being treated. For example, as illustrated, the first part of the apparatus may be jacketed as indicated at 14 so as to be heated by steam to a suitable temperature to maintain a sufficiently fluid condition to provide for the thorough incorporation and breaking up of the air. On the other hand, the latter portions of the mixer may involve some cooling and for this purpose the jacket 15 may receive in counter-flow cooling water which may, for example, be passing from the extruder hereafter described.

If a chewing gum base is to be incorporated in the aerated mixture, the mixture containing the suspended gas may be delivered through outlet passage 34 to the inlet passage of a second mixer 36. This second mixer may be of substantially the same form as the mixer previously described, but the paddles therein may be driven through shaft 38 at a substantially lower speed, for example, at a speed of 50 R. P. M. Into this mixer instead of air or other gas there will be introduced from a supply kettle 40 through passage 44 the chewing gum base pumped in predetermined proportion to the candy mixture by means of a positive pump 42, for example, of gear type driven by a synchronous motor arrangement or in some other fashion in synchronism with the motors 9 and 28, thus securing a definite proportioning of the chewing gum base to the candy mixture and the air.

By the use of paddles running at a relatively low rate of speed thorough incorporation of a molten chewing gum base may be attained without, however, using any such violence as would tend to injure the elastic properties of the rubber constituents of the base. It may be pointed out that since the base is introduced after aeration, the candy mixture, which is still at a moderately high temperature, is very much less viscous than the mixture would be without aeration, so that thorough admixture of the base with the candy mixture is readily attained.

Preferably the temperature in the mixer 36 is so maintained by cooling water in its jacket that the temperature is brought down to a point at which separation of the gas will not substantially take place, though the temperature is preferably maintained sufficiently high that sufficient fluidity for thorough admixture results. It may be noted that, consistent with the prevention of separation of the dispersed gas, the temperature may be maintained somewhat higher than would be permissible if the mixture was not being stirred, since the stirring, turning the mixture over and over and creating a somewhat turbulent condition, will prevent the separation.

The mixture of candy materials, chewing gum base and suspended gas is then delivered through passage 46 to a cooling and extruding apparatus indicated at 48, which is jacketed as indicated at 54 so as to be cooled by water preferably flowing in the direction of advance of material so that a sudden flash cooling is provided to prevent any separation of the air or coalescence of small bubbles into larger ones. The water in this jacket may be passed to the first mixer as indicated above. Until the temperature of the mixture drops to, say, 100° F. to 120° F. (though this is dependent upon the candy used), its viscosity will be insufficient to maintain in suspension the gas incorporated in the mixer if it is not continuously agitated, i. e., cold flow will take place, and if the mixture at temperatures higher than these was permitted to remain in quiescent condition, separation of the gas would readily take place. The cooling and extruding apparaus 48 is provided with a cylindrical bore in which there is located a screw conveyor 50, the shaft of which, as illustrated, is of considerable diameter, leaving, for example, a thread depth of one or two inches. The screw 50 is made with as large a pitch as possible consistent with the feed of the material which, upon cooling, may become quite viscous. A pitch equal to the diameter of the bore of the apparatus 24 will generally be found satisfactory. The screw should be driven at a speed synchronized with the feeding speeds of the various pumps heretofore mentioned so as to remove the material continuously from the system.

As the mixture enters the extruding apparatus 48, it will still be at a moderately high temperature and separation of the gas would tend to take place if agitation was not provided. In conjunction with the cooling effected by the jacket of the extruder, however, the operation of the screw conveyor provides sufficient agitation since the material will not originally be so viscous that it will not only tend to move axially, but will also tend to rotate with the conveyor, with the result that all portions thereof are continuously revolving about the shaft 52. This gravitational separation of the gas is inhibited until in the final portions of the bore the temperature is reduced to such extent that cold flow will not take place and the gas will remain entrapped even though agitation has ceased.

The discharge end of the apparatus is preferably tapered, as indicated at 56, to an extruding passage indicated at 58, from which the aerated candy or chewing gum is forced in the form of a rod or ribbon, indicated at 60, of a shape depending upon the shape of the opening indicated at 58. This rod or ribbon may be reduced in size or modified in shape by means conventionally illustrated as comprising rollers 62 and may then be passed directly to a wrapping machine 64 of conventional type, which need not be described.

The resulting product is extremely uniform in its composition and the gas is incorporated in the form of very minute bubbles which are not apparent upon inspection. The product is of low density, will not have an objectionable high degree of tackiness, and does not contain any sugar in the form of crystals producing a gritty type of product. Instead, upon biting into the resulting product, the sensation is much the same as biting into a caramel or similar candy.

While air is the gas usually to be incorporated, carbon dioxide or other desirable gases, for example, an inert gas such as nitrogen, may be used instead. In the case of the incorporation of carbon dioxide, there is presented a condition of substantial solubility of the gas in the candy mixture. Accordingly, the gas should be introduced in relatively large quantities so that as cooling takes place and increased solubility results, the bubbles will not completely disappear, since otherwise the result would bring the mixture back to a physical condition similar to that which would result if no incorporation of gas took place. The incorporation of carbon dioxide gives the candy a tang characteristic of carbonated beverages.

When a chewing gum of the type described is being formed, hydrogenated animal or vegetable oils may be incorporated, either in the candy mixture or in the chewing gum base. The relationship of the chewing gum base to the candy mixture may be varied to a large degree. Instead of what is generally known as chewing gum base being added, the added material may be the base together with a considerable proportion of candy constituents.

The invention is equally applicable to the preparation of candy without inclusion of any chewing gum base. In such case, of course, the intermediate mixer may be omitted and the aerated mixture fed directly from the first mixer to an extruder. The incorporation of air in accordance with the invention makes it possible to secure a candy of quite low specific gravity.

In the case of either the manufacture of candy or a chewing gum, it will be noted that the entire process takes place in a closed system. This, coupled with the exact measurement of the constituents being introduced, makes possible the attainment of an extremely uniform product.

In the case of a chewing gum of the prior type in which sugar is incorporated in a more or less finely pulverized form, a somewhat more porous product results which rather readily absorbs atmospheric air, becoming hard and unsalable. In accordance with the present invention, in which the product does not contain granules, an impenetrable surface results and destruction by oxidation does not so readily occur. This may be explained by the fact that in prior types of chewing gum the solids with respect to air were in a disperse phase to a very considerable extent, whereas in chewing gum formed in accordance with the present invention the gas is in the disperse phase with the result that the surface is substantially impervious to air.

What I claim and desire to protect by Letters Patent is:

1. The method of making candy or the like comprising producing a molten candy mixture, providing a regulated flow of said mixture to a mixing device while the mixture is at an elevated temperature and has a relatively low viscosity, providing a regulated flow of gas to said mixing device, the amount of gas bearing a substantially constant ratio to the amount of said mixture, producing a substantially uniform suspension of said gas in the form of small bubbles in said mixture, cooling said mixture with its suspended gas to a temperature at which the mixture will become viscous to the extent that the gas will not substantially separate therefrom, maintaining agitation of the suspension during the cooling until the aforementioned viscosity is obtained, and extruding the cooled mixture.

2. The method of making candy or the like comprising producing a molten candy mixture, providing a regulated flow of said mixture to a mixing device while the mixture is at an elevated temperature and has a relatively low viscosity, providing a regulated flow of gas to said mixing device, the amount of gas bearing a substantially constant ratio to the amount of said mixture, producing a substantially uniform suspension of said gas in the form of small bubbles in said mixture, cooling said mixture with its suspended gas to a temperature at which the mixture will become viscous to the extent that the gas will not substantially separate therefrom, and extruding the cooled mixture.

3. The method of making candy or the like comprising producing a molten candy mixture, providing a flow of said mixture to a mixing device while the mixture is at an elevated temperature and has a relatively low viscosity, providing a flow of gas to said mixing device, producing a substantially uniform suspension of said gas in the form of small bubbles in said mixture, cooling said mixture with its suspended gas to a temperature at which the mixture will become viscous to the extent that the gas will not substantially separate therefrom, maintaining agitation of the suspension during the cooling until the aforementioned viscosity is obtained, and extruding the cooled mixture.

4. The method of making candy or the like comprising producing a molten candy mixture, providing a flow of said mixture to a mixing device while the mixture is at an elevated temperature and has a relatively low viscosity, providing a flow of gas to said mixing device, producing a substantially uniform suspension of said gas in the form of small bubbles in said mixture, cooling said mixture with its suspended gas to a temperature at which the mixture will become viscous to the extent that the gas will not substantially separate therefrom, and extruding the cooled mixture.

5. The method of making candy or the like comprising producing a molten candy mixture, providing a flow of said mixture to a mixing device while the mixture is at an elevated temperature and has a relatively low viscosity, providing a flow of gas to said mixing device, producing a substantially uniform suspension of said gas in the form of small bubbles in said mixture, cooling said mixture with its suspended gas to a temperature at which the mixture will become viscous to the extent that the gas will not substantially separate therefrom, and maintaining agitation of the suspension during the cooling until the aforementioned viscosity is obtained.

6. The method of making candy or the like in a continuous process comprising producing a molten candy mixture, providing a flow of said mixture to a mixing device while the mixture is at an elevated temperature and has a relatively low viscosity, providing a flow of gas to said mixing device, producing a substantially uniform suspension of said gas in the form of small bubbles in said mixture, and cooling said mixture with its suspended gas to a temperature at which the mixture will become viscous to the extent that the gas will not substantially separate therefrom.

7. The method of making candy or the like comprising producing a molten candy mixture, providing a regulated flow of said mixture to a mixing device while the mixture is at an elevated temperature and has a relatively low viscosity, providing a regulated flow of gas to said mixing device, the amount of gas bearing a substantially constant ratio to the amount of said mixture, producing a substantially uniform suspension of said gas in the form of small bubbles in said mixture, cooling said mixture with its suspended gas to a temperature at which the mixture will become viscous to the extent that the gas will not substantially separate therefrom, and maintaining agitation of the suspension during the cooling until the aforementioned viscosity is obtained.

8. The method of making candy or the like comprising producing a molten candy mixture, providing a regulated flow of said mixture to a mixing device while the mixture is at an elevated temperature and has a relatively low viscosity, providing a regulated flow of gas to said mixing device, the amount of gas bearing a substantially constant ratio to the amount of said mixture, producing a substantially uniform suspension of said gas in the form of small bubbles in said mixture, and cooling said mixture with its suspended gas to a temperature at which the mixture will become viscous to the extent that the gas will not substantially separate therefrom.

9. The method of making candy or the like comprising producing a molten candy mixture, providing a regulated flow of said mixture to a mixing device while the mixture is at an elevated temperature and has a relatively low viscosity, providing a regulated flow of gas to said mixing device, the amount of gas bearing a substantially constant ratio to the amount of said mixture, producing a substantially uniform suspension of said gas in the form of small bubbles in said mixture, and cooling said mixture with its suspended gas to a temperature at which the mixture will become viscous to the extent that the gas will not substantially separate therefrom.

10. The method of making candy or the like comprising producing a molten candy mixture, providing a regulated flow of said mixture to a mixing device while the mixture is at an elevated temperature and has a relatively low viscosity, providing a regulated flow of gas to said mixing device, the amount of gas bearing a substantially constant ratio to the amount of said mixture, providing a regulated flow of a chewing gum base to said mixing device, and producing a substantially uniform suspension of said gas in the form of small bubbles in the mixture and a substantially uniform admixture of the chewing gum base and said candy mixture.

11. The method of making candy or the like comprising producing a molten candy mixture, providing a flow of said mixture to a mixing device while the mixture is at an elevated temperature and has a relatively low viscosity, providing a flow of gas to said mixing device, providing a flow of chewing gum base to said mixing device, producing a substantially uniform admixture of the candy mixture and chewing gum base and suspension of said gas therein in the form of small bubbles, cooling said mixture with its suspended gas to a temperature at which the mixture will become viscous to the extent that the gas will not substantially separate therefrom, and maintaining agitation of the suspension during the cooling until the aforementioned viscosity is maintained.

12. The method of making candy or the like comprising producing a molten candy mixture, providing a flow of said mixture to a mixing device while the mixture is at an elevated temperature and has a relatively low viscosity, providing a flow of gas to said mixing device, producing a substantially uniform suspension of said gas in the form of small bubbles in said mixture, and incorporating substantially uniformly in said mixture a chewing gum base.

13. Apparatus for making candy or the like comprising a mixing device, means for feeding in predetermined proportions to said mixing device a molten candy mixture and a gas, means for maintaining said mixture heated during incorporation of gas therein, means for cooling said candy mixture and suspended gas to a temperature at which the mixture becomes viscous to the extent that the gas will not substantially separate therefrom, and means for agitating the suspension during cooling until said viscosity is attained.

14. Apparatus for making candy or the like comprising a mixing device, means for feeding to said mixing device a molten candy mixture and a gas, means for maintaining said mixture heated during incorporation of the gas therein, means for cooling said mixture and the suspended gas to a temperature at which the mixture becomes viscous to the extent that the gas will not substantially separate therefrom, and means for agitating the suspension during cooling until said viscosity is obtained.

15. Apparatus for making candy or the like comprising a mixing device, means for feeding in predetermined proportions to said mixing device a molten candy mixture, a gas and a chewing gum base, means for maintaining said mixture heated during the incorporation of gas therein, means for cooling said mixture and suspended gas to a temperature at which the mixture becomes viscous to an extent that the gas will not substantially separate therefrom, and means for agitating the suspension during cooling until said suspension is obtained.

16. Apparatus for making candy or the like comprising a mixing device, means for feeding in predetermined proportions to said mixing device a molten candy mixture, a gas, and a chewing gum base, means for maintaining said mixture heated during incorporation of the gas therein, means for cooling said mixture and the suspended gas to a temperature at which the mixture becomes viscous to the extent that the gas will not substantially separate therefrom, and means for agitating the suspension during cooling until said viscosity is attained.

17. The method of making candy or the like comprising producing a molten candy mixture, providing a regulated flow of said mixture to a mixing device while the mixture is at an elevated temperature and has a relatively low viscosity, providing a regulated flow to said mixing device of a gas which is substantially soluble in the mixture in cold condition, the amount of gas bearing a substantially constant ratio to the amount of said mixture and being of such quantity that upon cooling the mixture of the gas and said candy mixture the gas will not wholly dissolve in said mixture, producing a substantially uniform suspension of said gas in the form of small bubbles in said mixture, cooling said mixture with its suspended gas to a temperature at which the mixture will become viscous to the extent that the gas will not substantially separate therefrom, and maintaining agitation of the suspension during the cooling until the aforementioned viscosity is attained.

JACOB WARREN BOWMAN.